(12) United States Patent
Kasai et al.

(10) Patent No.: US 10,115,037 B2
(45) Date of Patent: Oct. 30, 2018

(54) PATIENT IDENTIFICATION USING DYNAMIC MEDICAL IMAGES

(71) Applicant: KONICA MINOLTA LABORATORY U.S.A., INC., San Mateo, CA (US)

(72) Inventors: Satoshi Kasai, San Jose, CA (US); Taisuke Akahori, Campbell, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 28 days.

(21) Appl. No.: 15/076,039

(22) Filed: Mar. 21, 2016

(65) Prior Publication Data
US 2017/0270379 A1    Sep. 21, 2017

(51) Int. Cl.
G06K 9/00      (2006.01)
G06K 9/62      (2006.01)
G06T 7/00      (2017.01)

(52) U.S. Cl.
CPC .......... *G06K 9/6215* (2013.01); *G06T 7/0014* (2013.01); *G06K 2009/00939* (2013.01); *G06K 2209/05* (2013.01); *G06T 2207/10116* (2013.01); *G06T 2207/30048* (2013.01); *G06T 2207/30061* (2013.01)

(58) Field of Classification Search
None
See application file for complete search history.

(56) References Cited

U.S. PATENT DOCUMENTS 7,590,270 B2 * 9/2009 Asbeck .................. G06T 5/009
                                                    382/128
7,689,261 B2 * 3/2010 Mohr ...................... A61B 6/032
                                                    378/8

(Continued)

OTHER PUBLICATIONS

Morishita, Junji, Shigehiko Katsuragawa, and Keisuke Kondo. "An automated patient recognition method based on an image matching technique using previous chest radiographs in the picture archiving and communication system environment." Medical physics 28.6 (2001): 1093-1097.*

(Continued)

*Primary Examiner* — Andrae S Allison
(74) *Attorney, Agent, or Firm* — Chen Yoshimura LLP

(57) ABSTRACT

A patient identification method and related system use dynamic medical images of a patient, such as dynamic chest x-ray images, to generate pulsation and/or perfusion signals and use them for patient identification. A first pulsation and/or perfusion signal acquired from a current patient is compared to a previously stored second pulsation and/or perfusion signal associated with a known patient, to determine whether the current patient is the same as the known patient. At least one of the first and second pulsation and/or perfusion signals is generated from dynamic medical images. In some embodiments, one of the first and second pulsation and/or perfusion signals is pulsation-like signal obtained from electrocardiogram (ECG). When the current patient is determined to be different from the known patient, warning signals can be generated, and further steps can be taken to prevent medical procedures being conducted on the wrong patient.

14 Claims, 6 Drawing Sheets

(56) References Cited

U.S. PATENT DOCUMENTS

| | | | | |
|---|---|---|---|---|
| 2005/0015006 | A1* | 1/2005 | Mitschke | A61B 6/12 600/431 |
| 2008/0077158 | A1* | 3/2008 | Haider | A61B 17/15 606/130 |
| 2008/0292049 | A1* | 11/2008 | Camus | A61B 6/481 378/21 |
| 2010/0254512 | A1 | 10/2010 | Takeda | |
| 2012/0087562 | A1* | 4/2012 | Isaacs | G06F 19/321 382/131 |
| 2013/0113791 | A1* | 5/2013 | Isaacs | G06T 11/60 345/419 |
| 2016/0117823 | A1* | 4/2016 | Isaacs | G06T 3/20 715/863 |

OTHER PUBLICATIONS

Lamb et al, Automated Patient Identification and Localization Error Detection Using 2-Dimensional to 3-Dimensional Registration of Kilovoltage X-Ray Setup Images, International Journal of Radiation Oncology*Biology*Physics, vol. 87, Issue 2, Oct. 1, 2013, pp. 390-393.*

Wei et a, l Optimal image feature set for detecting lung nodules on chest X-ray images, CARS 2002—H.U. Lemke, M.W. Vannier; K. Inamura, A.G. Farman, K. Doi & J.H.C. Reiber.*

Fratini et al, Individual identification via electrocardiogram analysis, BioMed Eng OnLine (2015) 14:78.*

Biel L, Pettersson O, Philipson L, Wide P. ECG analysis: a new approach in human identification. IEEE Trans Instrum Meas. 2001;50(3):808-12 (IEEE).*

T. Syeda-Mahmood, D. Beymer and F. Wang, "Shape-based Matching of ECG Recordings," 2007 29th Annual International Conference of the IEEE Engineering in Medicine and Biology Society, Lyon, 2007, pp. 2012-2018.*

R. Bousselijot and D. Kreiseler, "ECG signal analysis by pattern comparison," Computers in Cardiology 1998. vol. 25 (Cat. No. 98CH36292), Cleveland, OH, 1998, pp. 349-352.*

Ginneken et al., "Computer-aided diagnosis in chest radiography: a survey", IEEE Transactions on Medical Imaging, vol. 20, Issue 12, Dec. 2001, pp. 1228-1241.

Xu et al., "Image feature analysis for computer-aided diagnosis: Detection of right and left hemidiaphragm edges and delineation of lung field in chest radiographs", Med. Phys. 23 (9), Sep. 1996, pp. 1613-1624.

Xu et al., "Image feature analysis for computer-aided diagnosis: Accurate Determination of ribcage boundary in chest radiographs", Med. Phys. 22 (5), May 1995, pp. 617-626.

Vittitoe et al., "Markov random field modeling in posteroanterior chest radiograph segmentation", Med. Phys. 26 (8), Aug. 1999, pp. 1670-1677.

Seghers et al., "Minimal Shape and Intensity Cost Path Segmentation", IEEE Transactions on Medical Imaging, vol. 26, No. 8, Aug. 2007, pp. 1115-1129.

Ginneken et al., "Segmentation of anatomical structures in chest radiographs using supervised methods: a comparative study on a public database", Medical Image Analysys, 10, 2006, pp. 19-40.

Nymi, "Nymi Band", https://nymi.com/product_overview, https://nymi.com/product_specs, https://nymi.com/using_the_nymi_band, 6 pages. printed from the internet on Mar. 21, 2016.

* cited by examiner

PATIENT IDENTIFICATION USING DYNAMIC MEDICAL IMAGES

BACKGROUND OF THE INVENTION

Field of the Invention

This invention relates to dynamic medical image analysis, and in particular, it relates to a method and related apparatus which use dynamic medical images for patient identification.

Description of Related Art

In healthcare settings, it is crucial to accurately identify patients being treated and avoid patient misidentification. Significant effort is expended to this end. One common method for patient identification is to use identification codes and machine readable labels affixed to documents, physical objects and patients. However, there are still chances of patient mix-up due to wrong tagging of patient ID or other human errors.

Dynamic medical image analysis has been used in diagnosis. For example, US Pat. Appl. Pub. No. 2010/0254512 describes a dynamic radiographing system which enables determination of an evaluation value of the heart function of a subject by plain radiography. Dynamic chest x-ray image analysis can be used to visualize and analyze lung functions (ventilation or perfusion).

SUMMARY

Embodiments of the present invention provide methods for patient identification using patient's dynamic medical images, as well as other medical information such as ECG (electrocardiogram), etc. In one embodiment, dynamic chest x-ray images are analyzed to extract pulsation-like signal which can be used for automatic patient identification.

An object of the present invention is to provide a method that uses dynamic medical images for patient identification, which can reduce the occurrence of patient mix-up in healthcare settings.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for patient identification, which includes: (a) obtaining a first series of multiple dynamic medical images associated with a first patient; (b) calculating first pulsation or perfusion data from using the first series of multiple dynamic medical images; (c) obtaining second pulsation or perfusion data associated with a second patient; (d) comparing the first pulsation or perfusion data with the second pulsation or perfusion data to determine whether the first patient is the same as the second patient; and (e) generating a warning signal when it is determined that the first patient is different from the second patient.

In some embodiments, the first series of multiple dynamic medical images are dynamic chest x-ray images.

In another aspect, the present invention provides a medical imaging and image analysis system which includes: a data processing and control apparatus; an image capture apparatus for capturing dynamic medical images; and a storage device storing a medical image database containing medical images generated by the image capture apparatus, wherein the data processing and control apparatus includes a processor and a computer usable non-transitory medium having a computer readable program code embedded therein, the computer readable program code configured to cause the a data processing and control apparatus to execute a process which includes: (a) obtaining a first series of multiple dynamic medical images associated with a first patient; (b) calculating first pulsation or perfusion information from using the first series of multiple dynamic medical images; (c) obtaining second pulsation or perfusion information associated with a second patient; (d) comparing the first pulsation or perfusion information with the second pulsation or perfusion information to determine whether the first patient is the same as the second patient; and (e) generating a warning signal when it is determined that the first patient is different from the second patient.

In some embodiments, the image capture apparatus is an x-ray image capture apparatus, and the first series of multiple dynamic medical images are dynamic chest x-ray images.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
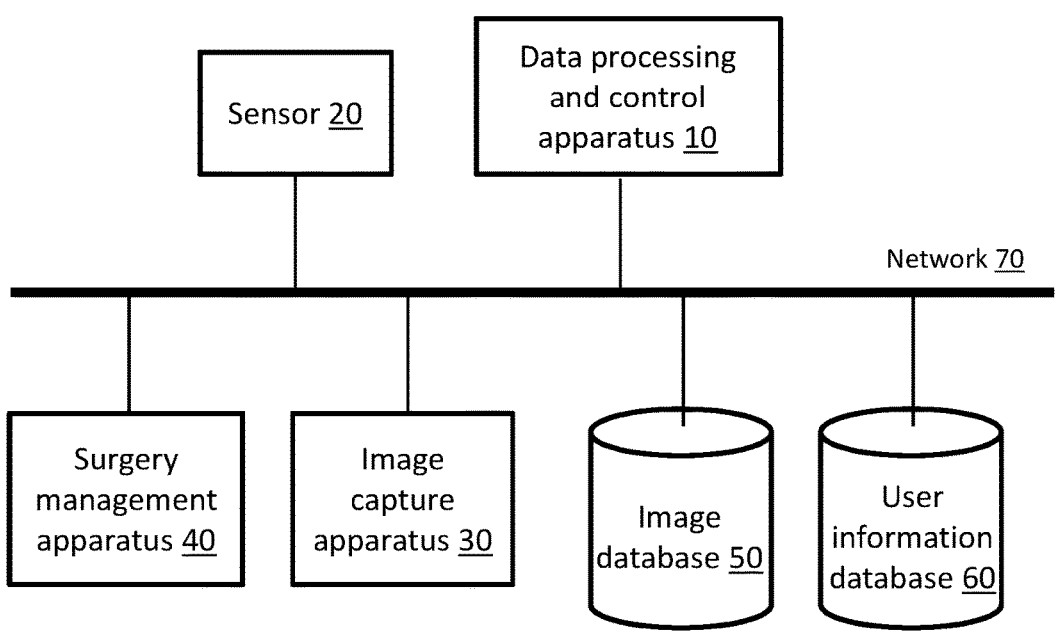
FIG. 1 schematically illustrates a medical imaging and image analysis system in which embodiments of the present invention may be implemented.

FIG. 1 schematically illustrates a medical imaging and image processing system in which embodiments of the present invention may be implemented. The system may be, for example, a digital radiography system. The system includes a data processing and control apparatus 10, a sensor 20 (such as an ECG sensor), an image capture apparatus 30 (e.g. x-ray image capture apparatus) capable of capturing dynamic x-ray images, a surgery management apparatus 40 used to manage related medical procedures, a storage storing a medical image database 50 containing medical images generated by the image capture apparatus 30 or other images, and a storage storing a patient information database 60 containing various patient information. These components are connected to each other by a network 70. The sensor 20 and the surgery management apparatus 40 are optional components.

Figure 2:
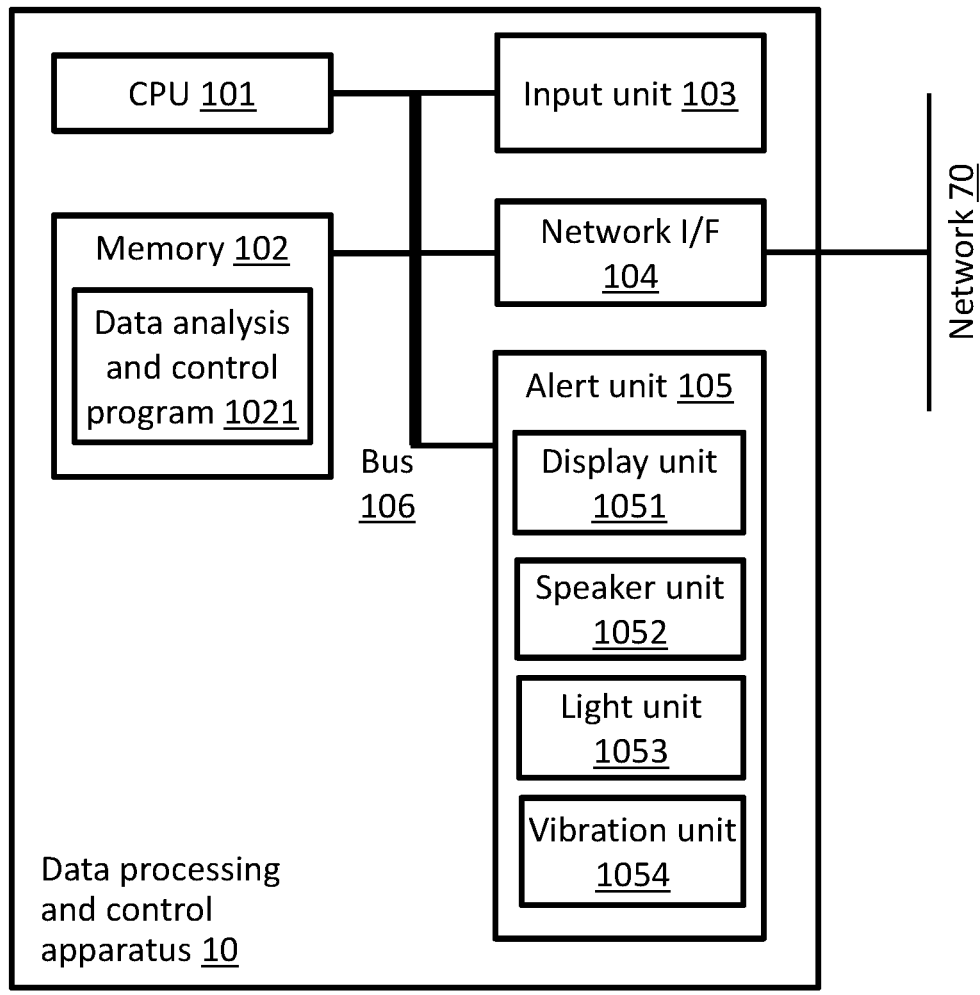
FIG. 2 schematically illustrates the structure of the data processing and control apparatus of the system shown in FIG. 1.

As schematically illustrated in FIG. 2, the data processing and control apparatus 10 includes a CPU 101, a memory 102 which stores various programs including a data analysis and control program 1021, an input unit 103, a network interface unit 104, and an alert unit 105. The above components are connected to each other by a bus 106. The alert unit 105 functions to generate various alert to the operator (e.g. the physician), and includes one or more of the following sub-units: display unit 1051, speaker unit 1052, light unit 1053, and vibration unit 1054.

Figure 3:
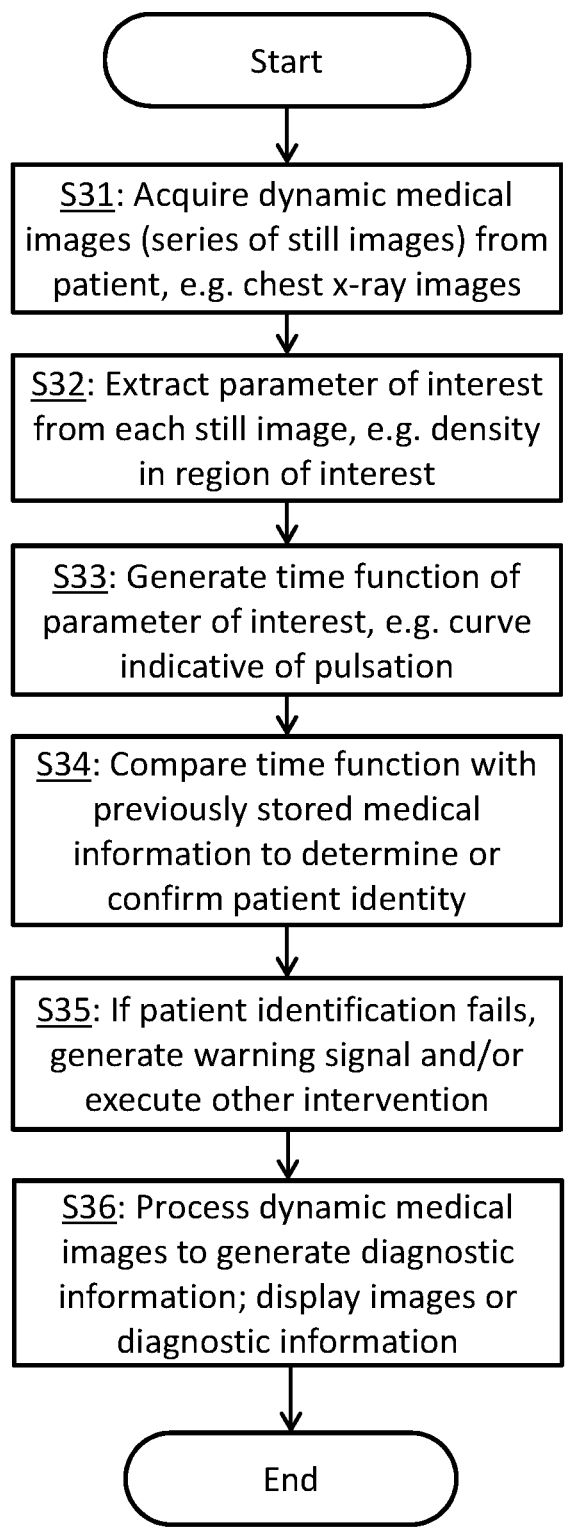
FIG. 3 schematically illustrates a patient identification method according to an embodiment of the present invention.

FIG. 3 schematically illustrates a patient identification method according to an embodiment of the present invention. In step S31, dynamic medical images are acquired from a patient using the image capture apparatus 30. Dynamic images comprise a series of multiple still images acquired in a time sequence. In a preferred embodiment, the dynamic medical images are dynamic chest x-ray images. For example, dynamic x-ray images may be obtained at 15 x-ray images (frames) per second for 10 seconds.

In step S32, using the data processing and control apparatus 10, each still image of the dynamic medical images is analyzed to extract a specific parameter of interest. In the preferred embodiment, the parameter of interest is the image density in a heart area of the image. In step S33, the parameter of interest extracted from the series of still images are used to generate a time function of the parameter. In the preferred embodiment, the time function of the parameter of interest is a curve that is indicative of the patient's pulsation (referred to as a pulsation curve or pulsation-like signal).

In step S34, the time function of the parameter of interest is compared with previously stored data (e.g. stored in the image database 50 or in the patient information database 60) which were acquired from known patients, for purpose of patient identification. In the preferred embodiment, the previously stored data are dynamic chest x-ray images, and they are processed the same way as the current dynamic chest x-ray images to obtain a time function for purpose of comparison. This step will be explained in more detail later.

In some embodiments, the previously stored data is associated with a particular known patient (intended patient) and step S34 is used to confirm that the current patient is the same as the intended patient (e.g. to confirm patient identity). In some other embodiments, previously stored data associated with multiple known patients are used in step S34 to determine which of the multiple known patients is the current patient (e.g. to determine patient identity). Both situations can be referred to as patient identification.

If in step S34 the patient identification fails, e.g. the current patient is determined to be different from the intended patient, a warning signal may be generated to alert the physician, for example, by using the alert unit 105 of the data processing and control apparatus 10 (step S35). The warning signal may be any form of signal including visual signal, audible signal, etc. Further, if the patient identification is being performed in real time during an image capture process or other medical procedure (e.g. surgery), the data processing and control apparatus 10 may control the image capture apparatus 30 or the surgery management apparatus 40 to prevent further image capture or other medical procedure until the misidentification issue is resolved.

The dynamic medical images acquired in step S31 are also processed to generate medical diagnostic information (step S36). For example, dynamic chest x-ray images may be analyzed to generate information about the patient's heart and lung functions, such as ventilation and perfusion, etc. The images and/or the diagnostic information may be displayed to the physician in the normal course of medical diagnosis.

Steps S32 to S36 are performed by the data processing and control apparatus 10 by executing the program 1021 stored in the memory 102.

Figure 4A:
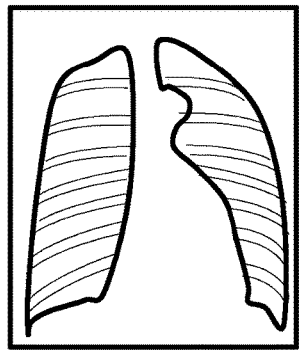
FIGS. 4a-4c depict a chest x-ray image and analysis of the image in an embodiment of the present invention.
Figure 4B:
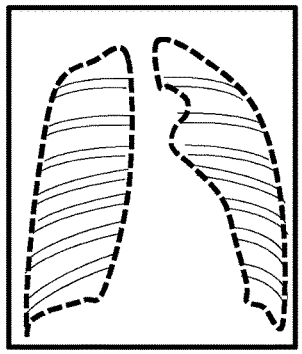
Figure 4C:
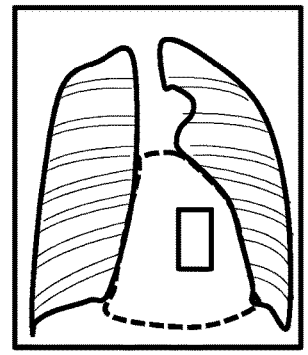

In a preferred embodiment, where the medical images are dynamic chest x-ray images, the image processing and analysis in step S32 is performed for each still image as follows (see FIGS. 4a-4c). First, the lung area is extracted from the chest x-ray image. Various methods are known in the art for extracting the lung area; any suitable method may be used in this step. The heart area is then identified based on the extracted lung area, and a region of interest (ROI) is defined within the heart area. The ROI may be a simple rectangular area based on the centroid of the heart area, or another shape based on the boundary of the heart area. It is preferable to avoid vertebrae areas in order to obtain a stable signal. FIG. 4a shows a chest x-ray image; FIG. 4b shows the extracted lung area in dashed lines; FIG. 4c shows the heart area in dashed lines as well as the ROI as a rectangular box. The x-ray data in the ROI is analyzed to calculate the parameter of interest, for example, a density value (maximum, minimum, median, or average density) of the x-ray image in the ROI.

Figure 5:
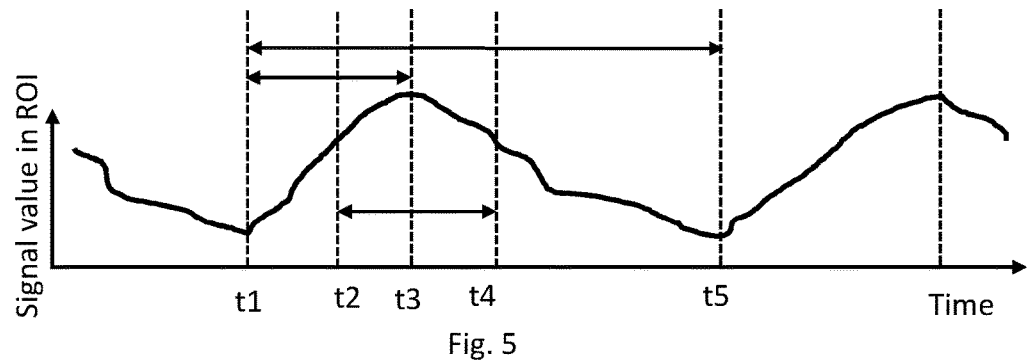
FIG. 5 schematically illustrates an exemplary pulsation-like signal generated from dynamic chest x-ray images using a method according to an embodiment of the present invention.

FIG. 5 schematically illustrates an exemplary time function generated in step S33, which is a density in ROI vs. time curve as described in the above embodiment. This curve is indicative of the pulsation of the patient.

In the comparison step S34, the previously stored data may be of the same type as the current patient data being analyzed, for example, they may both be dynamic chest x-ray images or pulsation information derived therefrom. Alternatively, the previously stored data and the current data may be of different type; for example, in one embodiment, the current data is dynamic chest x-ray images while the previously stored data is ECG (electrocardiogram) data, or vice versa. In the latter case, the data of different types are such that they contain characteristic features that are comparable to each other so the comparison of different types of data can provide patient identification.

In one embodiment, the comparison in step S34 includes evaluating a cross-correlation of the time function calculated from the current data (in step S33) and a time function calculated from the previously stored data. This method is suitable when the current data and previously stored data are of the same type and are processed in the same manner.

In another embodiment, the comparison in step S34 includes extracting characteristic features of the current time function data obtained in step S33 and comparing them to characteristic features extracted from the previously stored data. This method is suitable when the previously stored data is either of the same type as or of a different type from the current data (for example, when one is dynamic chest x-ray images and the other is ECG data). Using the time function shown in FIG. 5 (pulsation curve generated from dynamic chest x-ray images) as an example, the following characteristic features for the patient's pulsation are calculated:

(1) The pulsation period T, i.e. time between two adjacent minimum points t1 and t5 or two maximum points t3 and t6;

(2) The time T1 from a minimum point t1 to the next maximum point t3, i.e., T1=t3−t1;

(3) The ratio R of the minimum-to-maximum time to the maximum-to-minimum time, i.e. R=(t3−t1)/(t5−t3); and (4) The normalized peak width W, i.e. the ratio of the peak width to the pulsation period T, where the peak width is defined as the time between two time points t2 and t4 around the maximum point t3, where at time points t2 and t4 the signal value relative to the minimum signal value is a predetermine fraction k (e.g., one third) below the maximum signal value relative to the minimum signal value, i.e., (v3−v2)/(v3−v1)=k, where v1, v2, and v3 are the respective parameter values at time points t1, t2 and t3. I.e., W=(t4−t2)/(t5−t1).

All of the above values are preferably averaged over multiple periods of the pulsation.

The same characteristic features are calculated from the previously stored data. It is expected that some of the characteristic features extracted from the same type of data, e.g. dynamic chest x-ray, is relatively constant for a patient over time. For example, the minimum-to-maximum to maximum-to-minimum ratio R and the normalized peak width W may be expected to be relatively constant for a patient even though the pulsation period may change. Thus, these characteristic values can be used to confirm the patient's identity.

Figure 6:
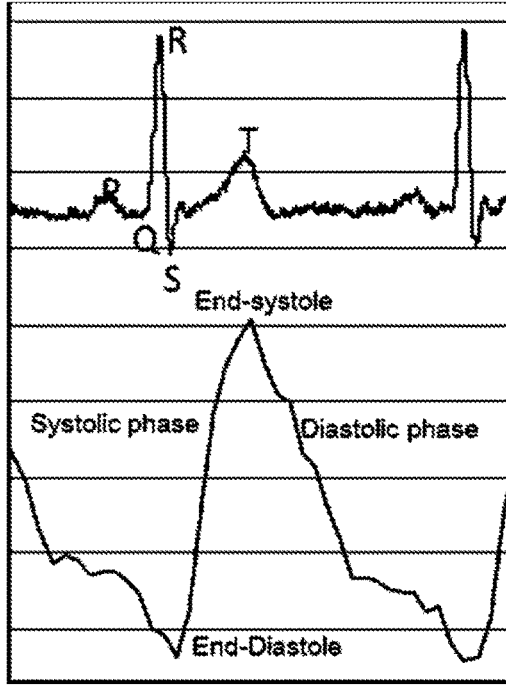
FIG. 6 schematically illustrates the comparison of an ECG signal and a pulsation-like signal generated from dynamic chest x-ray images.

An example of a type of data different from dynamic chest x-ray is ECG. The inventors of this invention discovered that for the same patient, pulsation-like signal derived from dynamic chest x-ray images has certain similar characteristic features as ECG signals. An example is shown in FIG. 6, where the upper half of FIG. 6 is an ECG signal and the lower half is a time function curve generated from dynamic chest x-ray images in the manner described above, from the same patient. The two curves have been scaled so that they have the same pulsation period. As seen in FIG. 6, when the location of the second highest peak T in the ECG coincides with the maximum point in the dynamic chest x-ray signal, the lowest point S in the ECG coincides with the minimum point of the dynamic chest x-ray signal. As a result, the S-to-T to T-to-S ratio in the ECG signal is approximately equal to the minimum-to-maximum to maximum-to-minimum ratio in the dynamic x-ray signal. This relationship can be used in step S34 to compare the pulsation curve generated from dynamic chest x-ray images with previously stored ECG data of known patient(s) for purpose of patient identification.

The specific comparison algorithms in step S34 may depend on the type of the data used in the comparison. For example, the tolerance of the comparison, either using cross-correlation or using characteristic features, may be determined empirically.

Figure 7:
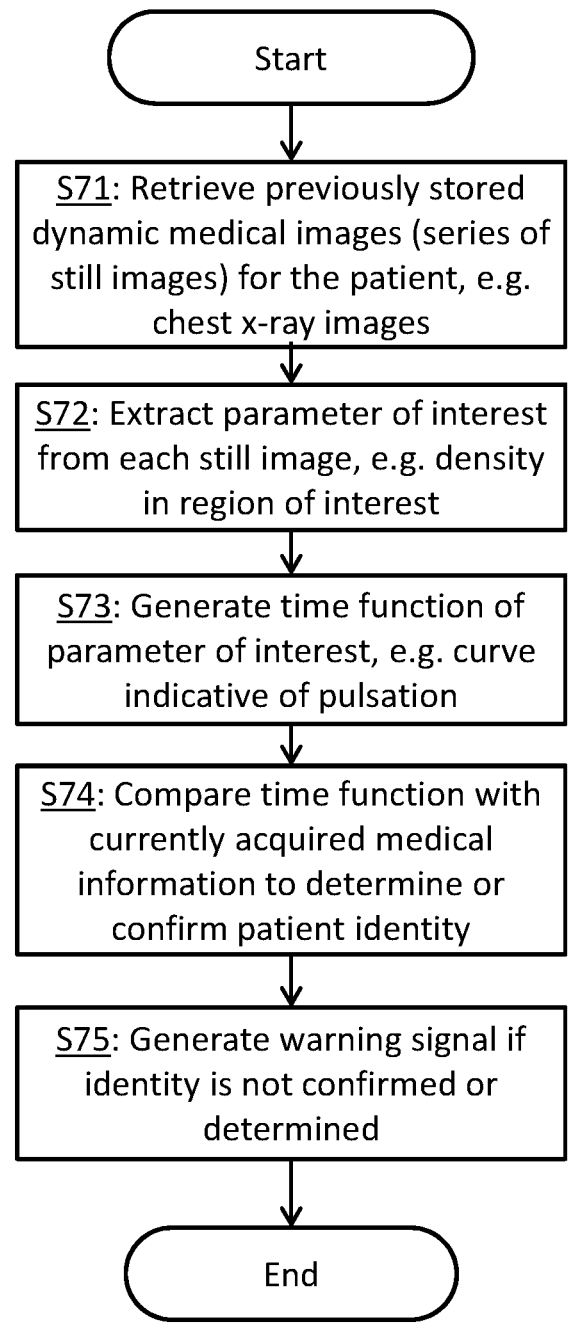
FIG. 7 schematically illustrates a patient identification method according to another embodiment of the present invention.

In the embodiment shown in FIG. 3, the current medical data is obtained from dynamic medical images, and the previously stored data may be the same type of dynamic medical images or other types of data such as ECG. In an alternative embodiment, the previously stored medical data is dynamic medical images while the current medical data obtained from the current patient is another type of data such as ECG. This alternative embodiment is shown in FIG. 7, where step S71 involves retrieving previously stored dynamic medical images. The processing steps S72 and S73 are similar to steps S32 and S33 in FIG. 3 but are performed on the previously stored dynamic medical images. In step S74, the time function generated from the previously stored dynamic medical images is compared to currently acquired medical data such as ECG for patient identification. Step S75 is similar to step S35.

Stated more generally, the patient identification method according to embodiments of the present invention achieves patient identification by comparing two sets of medical data, one set being current medical data acquired from a current patient, the other set being previously stored medical data for a known patient, where at least one of the two sets of medical data is dynamic medical images.

The patient identification methods described above may be useful in various practical use scenarios.

Figure 8A:
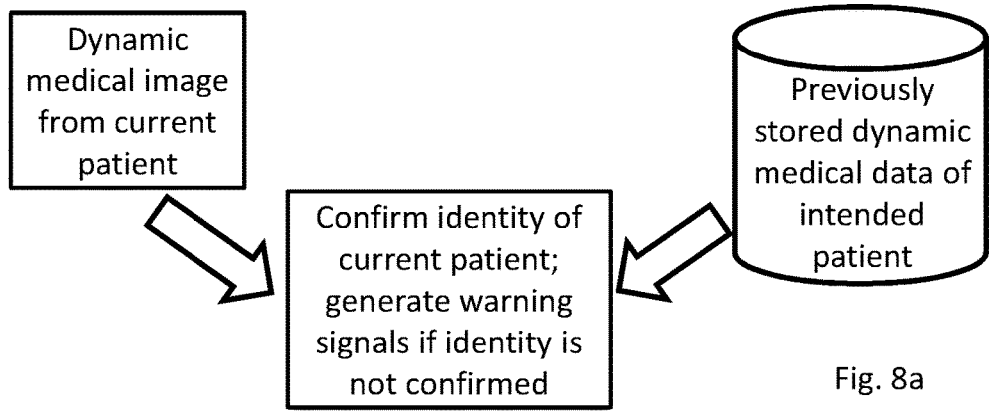
FIGS. 8a-8c schematically illustrate three practical use scenarios involving patient identification using embodiments of the present invention.

In a first use scenario (see FIG. 8*a*), a physician (e.g., radiologists or pulmonologists) interprets the dynamic medical images (e.g. dynamic chest x-ray images) for diagnostic purposes. Previously stored dynamic medical images for this patient exist (e.g. from an earlier medical examination), and the physician may use it as a part of the diagnosis process. The patient identification method can be used in this scenario to automatically confirm that the current patient is the same as the patient who is associated with the previously stored dynamic medical images. Warning signals may be generated to alert the physician if the patient identity is not confirmed. This can prevent the error that the current dynamic medical images being reviewed is from a wrong patient, which could occur due to system error, human error in data input, etc. Such an error would cause misdiagnosis. In this scenario, a display device (e.g. computer monitor) is typically used to display the dynamic medical images being reviewed, as well as other patient information (patient name, id, age, etc.), and sometimes also the previously stored dynamic medical images, so the warning message can be conveniently displayed on the display device.

A variation of the first scenario is that a physician retrieves a first series of dynamic medical images (e.g. dynamic chest x-ray images) from a data storage and interprets the images for diagnostic purposes. The images are associated with a particular patient (e.g., labeled with the patient ID). A second series of dynamic medical images (e.g. from an earlier medical examination) are stored for the same patient, and the physician may use it as a part of the diagnosis process. The patient identification method can be used in this scenario to automatically confirm that the patient associated with the first series of dynamic medical images is the same as the patient associated with the earlier stored second series of dynamic medical images.

Figure 8B:
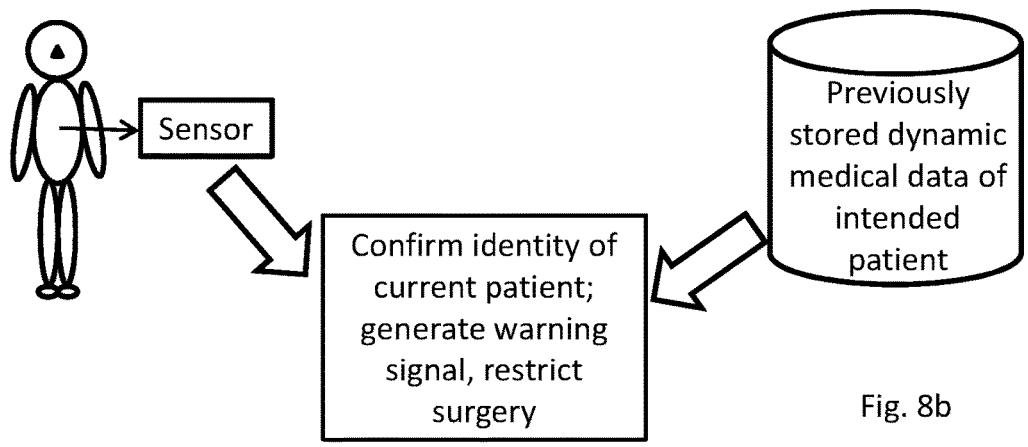

A second use scenario is pre-surgery patient identification (see FIG. 8*b*). The patient is a known patient but unable to re-confirm his identity prior to surgery due to various reasons. In this circumstance, dynamic signals from a sensor currently attached to the patient (e.g. ECG sensor) can be compared to previously stored dynamic medical images (e.g. dynamic chest x-ray data) associated with this patient to confirm that the current patient is the intended patient. In addition to warning signals, the data processing and control apparatus 10 may be connected to the surgery management apparatus 40 to restrict surgery when patient identity cannot be confirmed. This can prevent accidentally operating on a wrong patient.

Figure 8C:
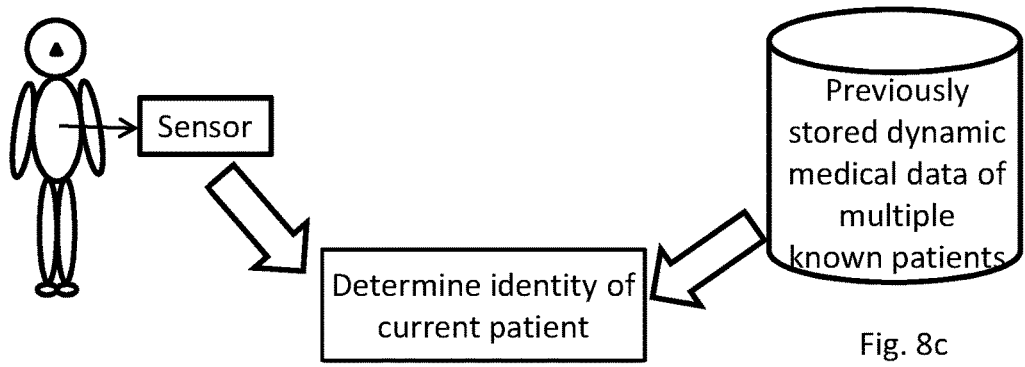

A third use scenario is patient identification in an emergency situation (see FIG. 8*c*). In an emergency situation, the patient may be unconscious and cannot identify himself, and the patient may not have other forms of ID on himself, so the medical workers have to diagnose the patient with very limited information. In this scenario, the dynamic medical data currently obtained from the patient (e.g. ECG) may be compared to previously stored dynamic medical images from multiple known patients to determine whether the current patient is one of the known patients. If the patient is identified in this manner, medical records for the patient can also be retrieved from the database to obtain more info about the patient.

An advantage of the patient identification method, particularly as applied to the above-described practical use scenarios, is that with the increased use of digital information management in the healthcare fields, physicians typically have ready access to previously stored medical images. Such previously stored medical images are often used to aid in evaluation of current medical images. Thus, advantageously, the previously stored medical images can be used to automatically perform patient identification for the current patient whose medical images is being evaluated. No operator intervention is required in this scenario and the system will automatically perform the patient identification and generate a warning signal to the physician when the identification fails.

One difference between the patient identification method according to embodiments of the present invention and other identification methods using biometric data is that the dynamic medical images used for patient identification in the present embodiments are images that are actually used for medical diagnosis purposes. Thus, there is no need to separately acquire biometric data that is solely used for identification purposes. Moreover, the warning signal may be generated using the same display device that the physician is using in the normal course of diagnosis purposes and at the time that the physician is performing diagnosis.

In the embodiment shown in FIG. 4a-6, the patient's pulsation information is used for patient identification. In other embodiments, perfusion (blood circulation) information from dynamic chest x-ray images can be used for patient identification. More specifically, an ROI in the lung area of the chest x-ray images is used, and a time function of image density in the ROI is indicative of the perfusion in the patient's lung. Perfusion data derived from current chest x-ray images and previously stored x-ray chest images can be compared to perform patient identification. In other alternative embodiments, a combination of pulsation and perfusion data is used for patient identification. In other embodiments, dynamic x-ray images from other parts of the patient's body, for example, to obtain blood flow pattern in blood vessel in other parts of the body.

In further embodiments, in addition to pulsation and perfusion data, shape features are also used for patient identification. Specifically, shapes of the lung area are extracted from the current dynamic chest x-ray images and the previously stored dynamic x-ray images, and the extracted shape features are compared each other. Patients are identified when either or both of the pulsation information and shape features comparison are matched. Shapes of the heart area may be used instead of, or together with, the shapes of the lung area.

It will be apparent to those skilled in the art that various modification and variations can be made in the patient identification method and related apparatus of the present invention without departing from the spirit or scope of the invention. Thus, it is intended that the present invention cover modifications and variations that come within the scope of the appended claims and their equivalents.

What is claimed is:

1. A method for patient identification, comprising:
   (a) retrieving from a database a first series of multiple dynamic chest x-ray images associated with a first patient;
   (b) using the first series of multiple dynamic chest x-ray images, calculating first pulsation data which is a time function of a parameter indicative of the first patient's pulsation;
   (c) using a sensor attached to a second patient, obtaining second pulsation data which is a time function of a parameter indicative of the second patient's pulsation;
   (d) comparing the first pulsation data with the second pulsation data to determine whether the first patient is the same as the second patient; and
   (e) generating a visual or audible warning signal in response to a determination that the first patient is different from the second patient.

2. The method of claim 1, further comprising:
   when it is determined that the first patient is different from the second patient, controlling a surgery management apparatus to restrict a surgery to be performed on the second patient.

3. The method of claim 1, wherein the second pulsation data is obtained from electrocardiogram (ECG).

4. The method of claim 3, wherein step (d) includes calculating one or more first characteristic features from the first pulsation data, calculating one or more second characteristic features from the second pulsation data, and comparing the first and second characteristic features.

5. The method of claim 1, further comprising:
   when it is determined that the first patient is different from the second patient, controlling an image capture apparatus to restrict an image capture processing being performed on the first patient.

6. The method of claim 1, wherein step (d) includes calculating a cross-correlation of the first pulsation data and the second pulsation data.

7. The method of claim 1, further comprising, before step (d):
   extracting a shape feature of a lung area or a heart area of the first patient using the first series of multiple dynamic chest x-ray images;
   obtaining a second series of multiple dynamic chest x-ray images associated with the second patient;
   extracting a shape feature of a lung area or a heart area of the second patient using the second series of multiple dynamic chest x-ray images;
   wherein step (d) comprises both comparing the first pulsation data with the second pulsation data and comparing the shape feature of the lung area or the heart area of the first patient with the shape feature of the lung area or the heart area of the second patient to determine whether the first patient is the same as the second patient.

8. A medical imaging and image analysis system comprising:
   a data processing and control apparatus including an alert unit, the alert unit being a display, a speaker, a light or a vibrator;
   an x-ray image capture apparatus for capturing dynamic chest x-ray images;
   a sensor adapted to be attached to patients; and
   a storage device storing a medical image database containing medical images generated by the image capture apparatus,
   wherein the data processing and control apparatus includes a processor and a computer usable non-transitory medium having a computer readable program code embedded therein, the computer readable program code configured to cause the a data processing and control apparatus to execute a process which comprising:

(a) controlling an x-ray image capture apparatus to capture a first series of multiple dynamic medical images associated with a first patient;

(b) using the first series of multiple dynamic chest x-ray images, calculating first pulsation data which is a time function of a parameter indicative of the first patient's pulsation;

(c) based on signals received from the sensor attached to the second patient, obtaining second pulsation data which is a time function of a parameter indicative of a second patient's pulsation;

(d) comparing the first pulsation data with the second pulsation data to determine whether the first patient is the same as the second patient; and (e) generating a visual or audible warning signal with the alert unit in response to a determination that the first patient is different from the second patient.

9. The system of claim 8, further comprising a surgery management apparatus controlled by the data processing and control apparatus, wherein the process further comprises: when it is determined that the first patient is different from the second patient, controlling the surgery management apparatus to restrict a surgery to be performed on the second patient.

10. The system of claim 8, wherein the sensor is an electrocardiogram (ECG) sensor.

11. The system of claim 10, wherein in the process, step (d) includes calculating one or more first characteristic features from the first pulsation data, calculating one or more second characteristic features from the second pulsation data, and comparing the first and second characteristic features.

12. The system of claim 8, wherein the process further comprises:
when it is determined that the first patient is different from the second patient, controlling the image capture apparatus to restrict an image capture processing being performed on the first patient.

13. The system of claim 8, wherein step (d) of the process includes calculating a cross-correlation of the first pulsation data and the second pulsation data.

14. The system of claim 8, wherein the process further comprising, before step (d):
extracting a shape feature of a lung area or a heart area of the first patient using the first series of multiple dynamic chest x-ray images;
obtaining a second series of multiple dynamic chest x-ray images associated with the second patient;
extracting a shape feature of a lung area or a heart area of the second patient using the second series of multiple dynamic chest x-ray images;
wherein step (d) comprises both comparing the first pulsation data with the second pulsation data and comparing the shape feature of the lung area or the heart area of the first patient with the shape feature of the lung area or the heart area of the second patient to determine whether the first patient is the same as the second patient.

* * * * *